Aug. 27, 1963
K. J. GEROU
3,101,958
CARGO CARRIER
Filed Nov. 9, 1959
6 Sheets-Sheet 1
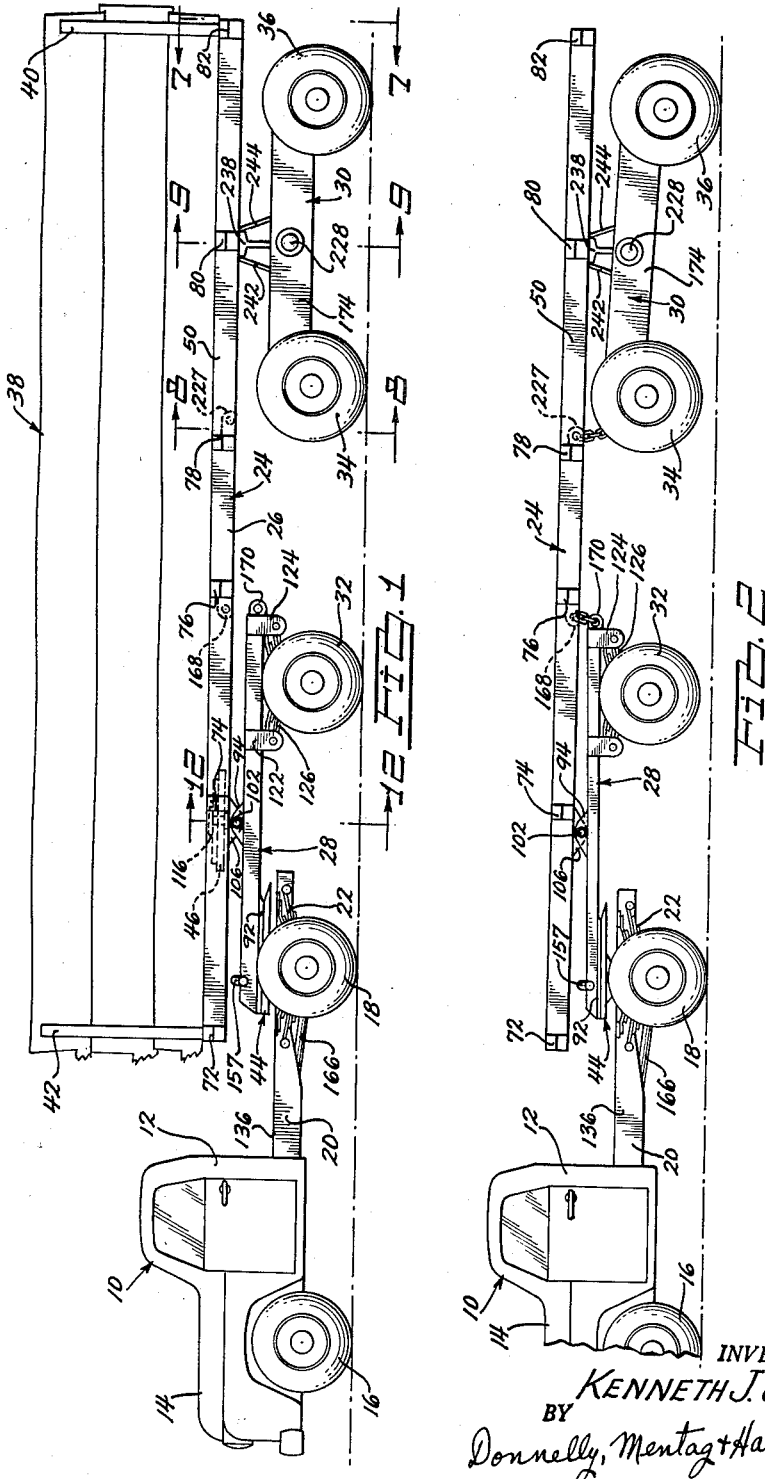
INVENTOR.
KENNETH J. GEROU
BY
Donnelly, Mentag + Harrington
ATTORNEYS Aug. 27, 1963

K. J. GEROU 3,101,958

CARGO CARRIER

Filed Nov. 9, 1959

INVENTOR.
KENNETH J. GEROU
BY
Donnelly, Mentag & Harrington
ATTORNEYS

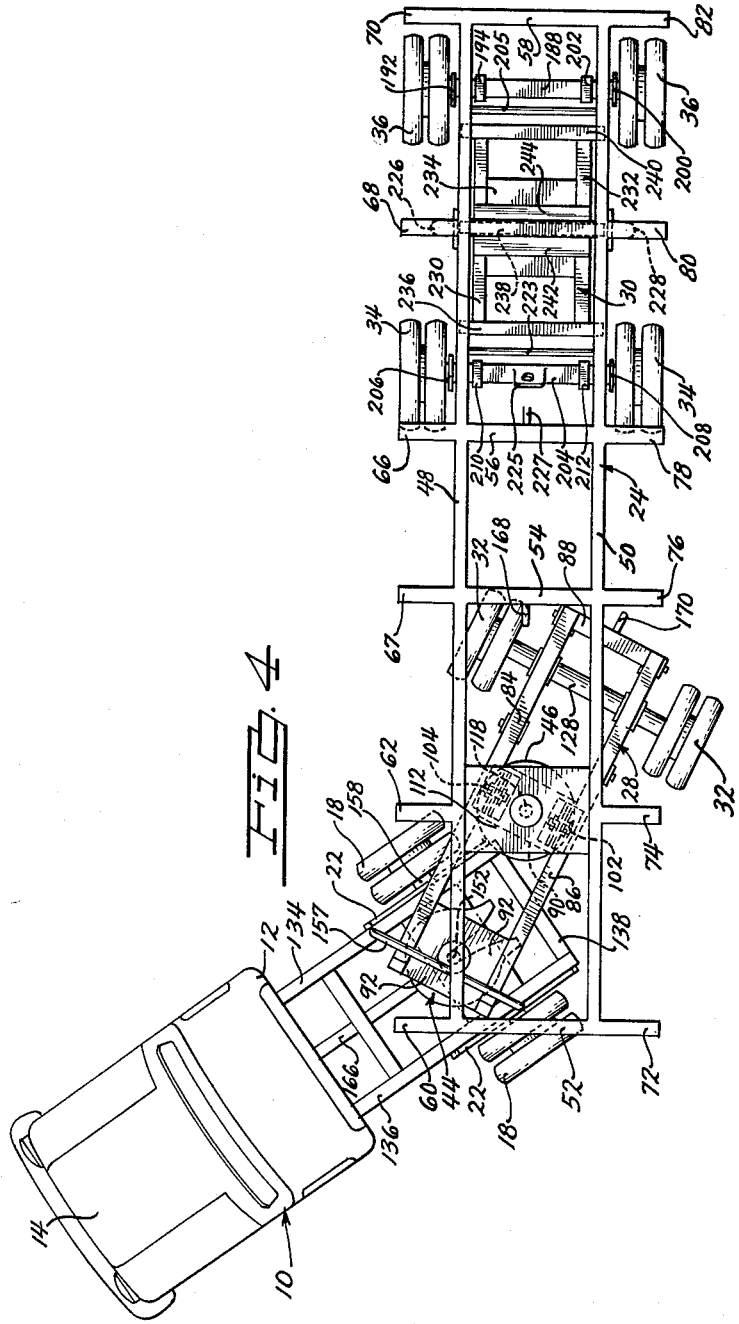

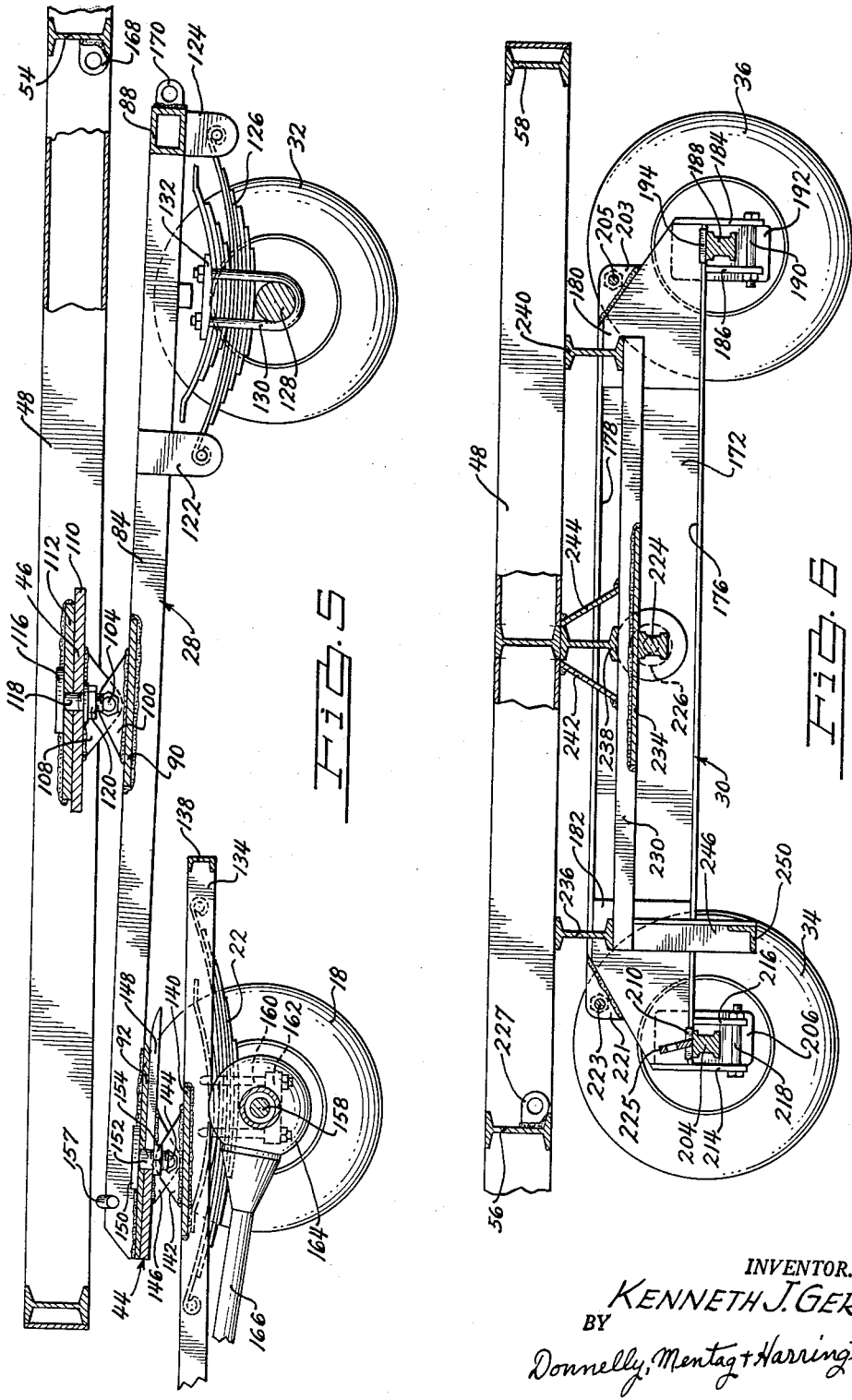

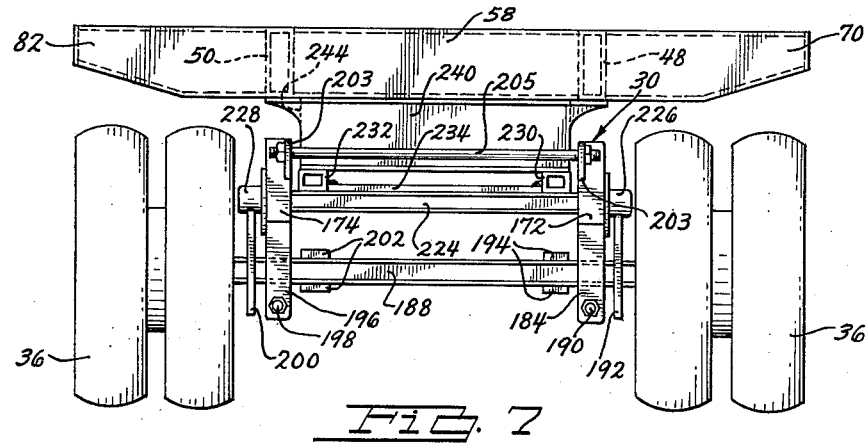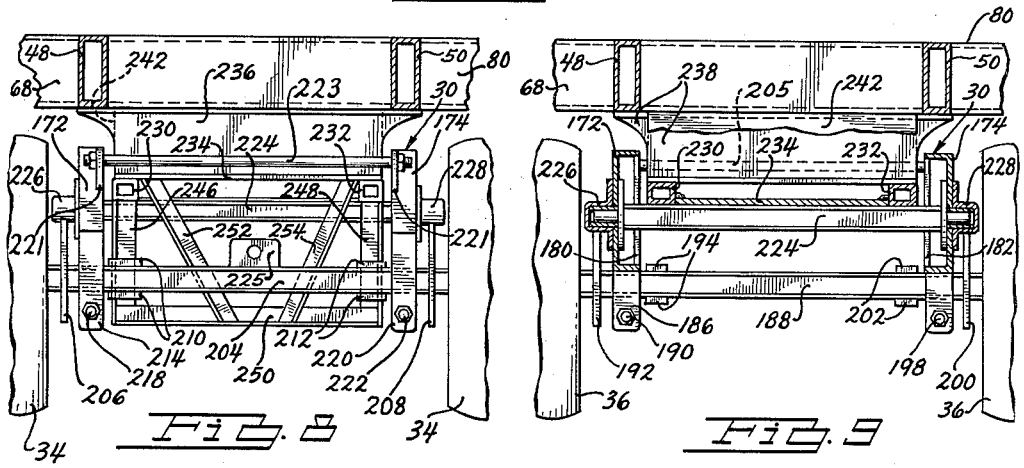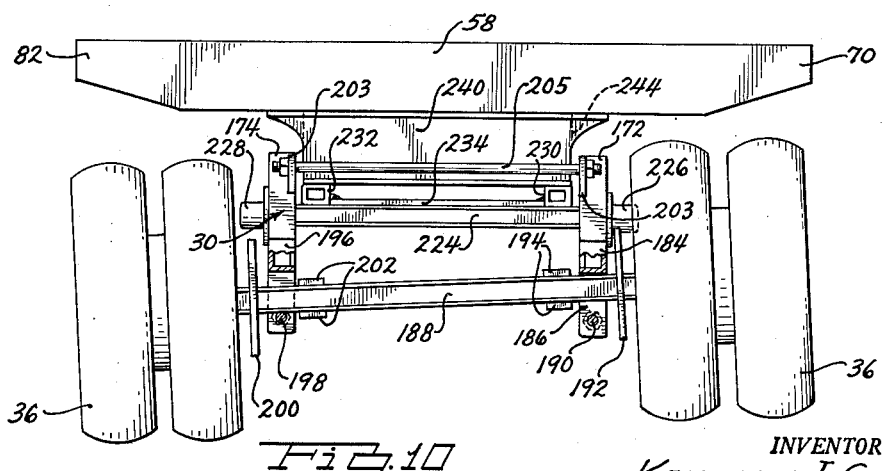

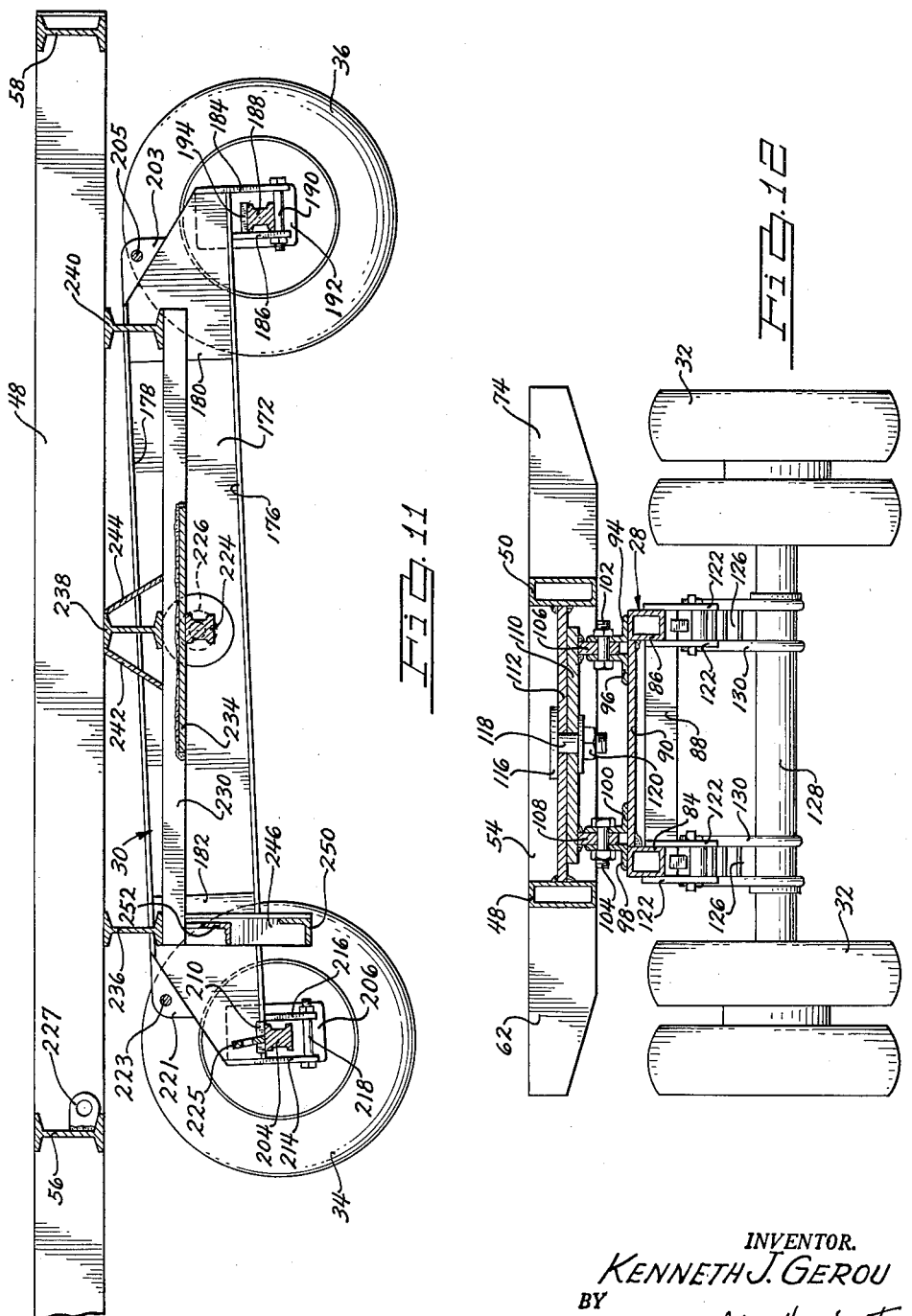

United States Patent Office 3,101,958
Patented Aug. 27, 1963

3,101,958
CARGO CARRIER
Kenneth J. Gerou, P.O. Box 222, Newberry, Mich.
Filed Nov. 9, 1959, Ser. No. 851,763
6 Claims. (Cl. 280—423)

My invention relates generally to cargo carriers and more particularly to a new and improved truck trailer capable of carrying heavy loads.

The maximum axle loads permitted for carriers of this type and the axle spacing is established by legislation in the various States of the Union. Further, the overall length and width of tractors and trailers and trailer combinations are regulated.

The established maximum load limits determine the maximum pay load which the vehicle can accommodate. In many types of loadings the most economical trucking procedures therefore call for a loading which is at or near the maximum permitted by law. The actual allowable gross axle load limit established by the state legislatures for any given vehicle is dependent in part on the type of vehicle. For example, whether the load limit depends upon a semi-trailer or full trailer arrangement is employed. Also, the wheel spacing for both the trailer and tractor is pertinent.

It is a principal object of my invention to provide a tractor and trailer arrangement which will permit a uniformly distributed axle loading and a greatly increased loading capacity that is consistent with existing State regulations.

It is another object of my invention to provide a carrier of the type above set forth in which a unitary load carrying platform is used for carrying the load and wherein the platform is supported on a pair of independent, wheeled undercarriages.

It is a further object of my invention to provide a carrier of the type above set forth wherein a new and simplified suspension means is used for supporting the load carrying platform.

It is a further object of my invention to provide a carrier of the type above set forth wherein the number of road engaging wheels of the undercarriages may be reduced in those instances when the vehicle is traveling with very light loads or with no payload.

It is a further object of my invention to provide a truck as above set forth wherein provision is made for stabilizing the load carrying platform during operation of the vehicle over irregular terrain and road surfaces.

I am aware of trucking regulations in some of the States which prohibit the use of tandem truck trailers on State highways regardless of the overall length of the tractor and trailer combination. A trucker using a trailer arrangement in interstate commerce must therefore disengage the secondary trailer from his equipment before entering a State which legislates against the use of such trailer arrangements. This procedure increases the overall operating costs for the trucker and substantially increases the delivery time. It is therefore another principal object of my invention to provide a cargo carrier having a load carrying capacity equal to or greater than that of tractor and trailer arrangements of conventional construction, but which will fully comply with the State highway regulations in all of the States of the Union with regard to the use of tandem trailers and semi-trailers.

It is another object of my invention to provide a trailer of the type above set forth which is characterized by simplicity of construction and which may be readily manufactured by employing known manufacturing techniques.

For the purpose of particularly describing the principal features of my invention reference will be made to the accompanying drawings wherein:

FIG. 1 is a side elevation view of the carrier of my instant invention. The carrier is shown in a loaded condition;

FIG. 2 is a side elevation view similar to FIG. 1 showing the carrier in an unloaded condition and with two of the road engaging wheels moved to an inoperative position;

FIG. 4 is a plan view of the carrier of FIGS. 1, 2 and 3 wherein the tractor portion of the carrier is angularly displaced with respect to the trailer portion to simulate a turning maneuver;

FIG. 5 is a partial cross sectional view of the forward portion of the trailer shown in FIGS. 1 through 4 and is taken along section line 5—5 of FIG. 3;

FIG. 6 is a partial cross sectional view of the rearward portion of the trailer shown in FIGS. 1 through 4 and is taken along section line 6—6 of FIG. 3;

FIG. 7 is a rear end view of the carrier of my instant invention as viewed from the plane of section line 7—7 of FIG. 1;

FIG. 8 is a cross sectional view of the carrier of my instant invention as viewed from the plane of section line 8—8 of FIG. 1;

FIG. 9 is a cross sectional view of the trailer of my invention as viewed from the plane of section line 9—9 of FIG. 1;

FIG. 10 is an end view of the carrier of my instant invention which is similar to the end view of FIG. 7 above described. FIG. 10 differs from FIG. 7, however, in that the former shows the axle for the rearmost wheels of the carrier in a tilted position relative to the plane of the load carrying platform;

FIG. 11 is a view similar to the cross sectional view of FIG. 6 and it shows a tilted position of the road engaging wheels relative to a transverse pivotal axis; and FIG. 12 is a cross sectional view of the carrier of my instant invention and is taken along section line 12—12 of FIG. 1.

Figure 3:
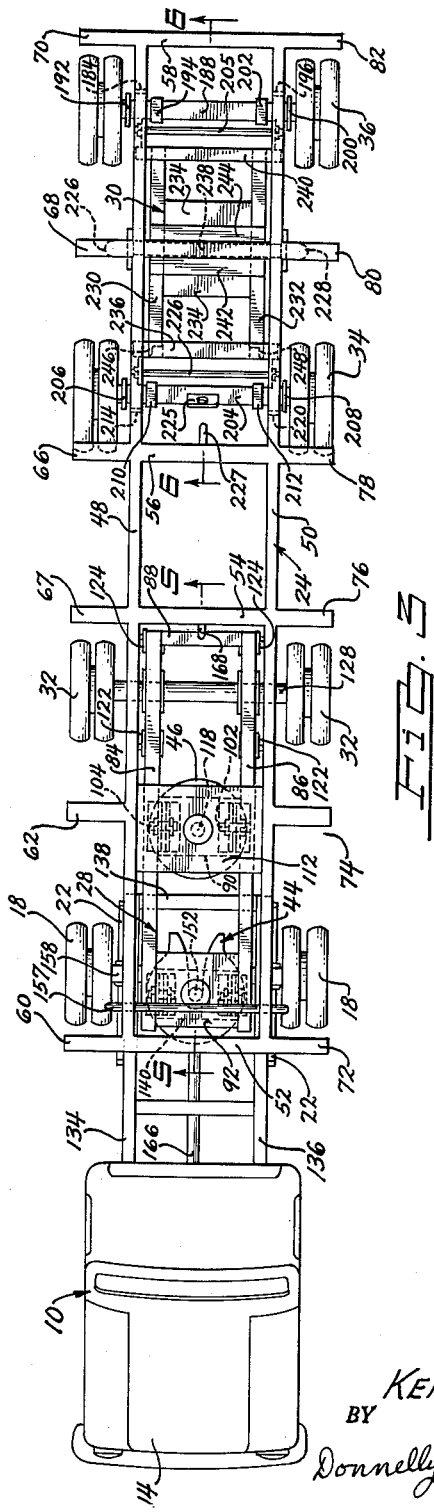
FIG. 3 is a plan view of the carrier shown in FIGS. 1 and 2.

Referring first to FIG. 1, numeral 10 generally designates a tractor that comprises a cab 12, an engine compartment 14, dirigible wheels 16 and traction wheels 18. The traction wheels 18 may be supported on the tractor frame structure 20 by suitable spring suspension mechanisms generally identified by numeral 22.

The trailer portion of my improved cargo carrier is generally identified by numeral 24 and it includes a loading platform 26, a first undercarriage generally identified by the numeral 28 and a second undercarriage generally identified by the numeral 30. The first undercarriage 28 includes road engaging wheels 32 that are adapted to support undercarriage 28 and the forward portion of the trailer assembly by means of a suspension which will subsequently be described. The undercarriage 30 includes road engaging wheels 34 and 36, and it is operatively connected to the superstructure of the trailer assembly by means of a suitable pivotal connection which also will be described subsequently. The wheels 34 and 36 are carried by a frame portion of the undercarriage 30 by means of a suspension arrangement that will accommodate a limited amount of free relative movement between the wheels and the main portions of the undercarriage.

The loading platform 26 is adapted to carry a load as illustrated in FIG. 1 and which is identified by reference character 38. Suitable supporting uprights 40 and 42 may be provided as shown to maintain stability of the load 38.

In FIG. 2 I have illustrated my improved cargo carrier in an unloaded condition with the wheels 32 and 34 in a raised position. The structural arrangement of the component elements of my improved cargo carrier which will accommodate such a raised position of the wheels 32 and 34 will be described with reference to the other figures of the drawings.

The first undercarriage 28 is connected to the tractor frame structure 20 by means of a fifth wheel generally identified by reference character 44, said fifth wheel being adapted to accommodate a turning movement of the frame structure 20 with respect to the center line of the forward undercarriage 28. In a similar fashion the connection between the undercarriage 28 and the platform 26 includes a fifth wheel 46 which will accommodate a turning movement of the undercarriage 28 with respect to the center line of platform 26. The fifth wheels 44 and 46 facilitate turning maneuvers as indicated in the plan view of FIG. 4. As illustrated in FIG. 4, the tractor 10 is negotiating a right hand turn and this causes an angular deviation between the longitudinal center lines of undercarriage 28 and the tractor frame structure 20, and it also causes an angular variation between the longitudinal center lines for the platform 26 and the undercarriage 28. Such a compound movement improves roadability and prevents sliding action between the wheels and the road surface.

The platform 26 comprises a pair of side rails 48 and 50 which are preferably of boxed construction. Each of the side rails is continuous from the forward to the rear ends thereof. The side rails 48 and 50 are joined together at longitudinally spaced locations by transverse cross members 52, 54, 56 and 58, and each of these cross members is also preferably of boxed construction. The cross members 52, 54, 56 and 58 are integrally joined to the side rails 48 and 50 to form a unitary platform structure adapted to accommodate a load. Transverse extensions 60 through 82 are provided as shown and certain of these extensions form lateral continuations of the transverse cross members 52, 54, 56 and 58. These transverse extensions are situated in cantilever fashion and the upper surfaces thereof are situated in the top plane of side rails 48 and 50.

By referring to FIGS. 5 and 12, the construction of the first undercarriage 28 can be more fully understood. The undercarriage 28 comprises a pair of boxed side rails 84 and 86 and they are joined together at the rearward end thereof by a boxed transverse cross member 88. The intermediate portion of the side rails 84 and 86 are joined together by a connecting plate 90 and the forward ends of the side rails 84 and 86 are joined together by plate 92. A pair of angle brackets 94 and 96 is situated on one transverse side of the undercarriage 28 in juxtaposed relationship, the base flanges of these brackets being welded or otherwise secured to side rail 86 and plate 90, as illustrated. In a similar fashion a pair of brackets 98 and 100 is disposed on the opposite side of the undercarriage 28, and the base flanges of the brackets 98 and 100 are welded or otherwise secured to side rail 84 and to plate 90, respectively. The upwardly extending flanges of brackets 94 through 100 are apertured to accommodate pivot pins 102 and 104. A pivot bracket 106 is situated between the upwardly extended flanges of brackets 94 and 96 and is pivotally connected thereto by pivot pin 102. Similarly, a pivot bracket 108 is disposed on the opposite side of the undercarriage 28 between the upwardly extending flanges of brackets 98 and 100. Pin 104 provides a pivotal connection between bracket 108 and brackets 98 and 100. The brackets 106 and 108 may be welded or otherwise secured to a guide plate 110 of the fifth wheel 46.

A plate 112 is situated between side rails 48 and 50, and is permanently secured thereto by welding or by other suitable means. Plate 112 is disposed in sliding relationship with respect to guide plate 110 and it carries a pivot pin or stud for the fifth wheel 46, said pin having a flanged end 116 and a shank portion 118. Suitable releasable fastening means 120 may be provided to prevent relative vertical movement between guide plates 110 and 112.

A pair of spring supporting brackets 122 is connected to side rail 86 at one location thereon, and another pair of spring supporting brackets 124 is connected to side rail 86 at a location spaced from brackets 122. Brackets 122 and 124 carry pins for end supporting a leaf spring assembly 126 for wheels 32. The axle for wheels 32 is shown at 128 and it is connected to the center region of leaf spring assembly 126 in a conventional fashion, this connection including U-shaped brackets 120 straddling the leaf spring assembly 126. The upper ends of brackets 120 are threadably connected to a connecting plate 132. The undercarriage 28 includes another spring assembly 126 on the opposite side thereof and it is substantially identical in character to the mechanism previously described with relation to side rail 86.

I contemplate that spacers may be interposed between the side rails 84 and 86 and the associated leaf spring assembly in order to prevent deflection of the spring assemblies and relative displacement of axle 128 with respect to the side rails 84 and 86 of undercarriage 28.

As seen in FIG. 3, the frame structure 20 for the tractor 10 includes a pair of parallel side rails 134 and 136. The rearward ends of side rails 134 and 136 are connected by transverse cross member 138 and the intermediate portions of these side rails are interconnected by supporting plate 140. A pair of transversely spaced pivot brackets 142 are rigidly connected to plate 140 and they are apertured to receive pivot pins 144. These pins 144 form a pivotal connection between brackets 142 and cooperating brackets 146 which in turn are fixed to guide plate 148 of the aforementioned fifth wheel 44. Plate 92 is disposed in sliding engagement with guide plate 148 and it carries a pivot pin or stud having a head 150 and a shank 152, the latter being situated in a cooperating groove or cutaway region in guide plate 148. Relative vertical movement between plates 92 and 148 is prevented by a releasable locking mechanism generally shown at 154.

As previously indicated, the traction wheels 18 for the tractor 10 are suspended from the frame structure 20 by a pair of leaf spring assemblies shown at 22, each spring assembly 22 being pinned to one of the associated side rails 134 and 136. The axle for traction wheels 18 is shown at 158 and it is connected at spaced locations to the center portions of spring assemblies 156 by means of suitable U-shaped clamping brackets 160 and a cooperating threaded clamping plate 162.

The truck differential and axle housing is shown at 164 and the power delivery drive shaft is shown at 166.

It is apparent from the foregoing description that the undercarriage 28, the platform 26 and the truck frame structure 20 are capable of undergoing compound relative movement. The side rails 84 and 86 of the undercarriage 28 may be pivoted about the axis pins 102 and 104 during operation of the carrier thereby accommodating angular variations in the plane of the platform 26 relative to the plane of the side rails 84 and 86. In a similar fashion the pivotal connection between the forward end of side rails 84 and 86 and the truck frame structure 20 will accommodate deviations in the angle of the plane of the side rails 84 and 86 with respect to the plane of the side rails 134 and 136 of the truck frame structure 20. This motion is in addition to the turning movement between the undercarriage 28 and platform 26 permitted by fifth wheel 46, and in addition to the turning movement between undercarriage 28 and the frame structure 20 permitted by fifth wheel 44.

When the carrier is loaded the wheels 32 are permitted to assume the position shown in FIG. 5, and they are therefore adapted to carry a portion of the load. However, when the vehicle is traveling without the load, the wheels 32 and axle 128 may be jacked upwardly as illustrated in FIG. 2 relative to the wheels 18 and axle 158.

This vertically displaced position is maintained by tying together eyelets 168 and 170, the eyelet 168 being connected to cross member 54 of platform 26 and eyelet 170 being connected to cross member 88 of undercarriage 28. By preference, this connection may be made by means of a chain or a suitable hook.

Referring next to FIGS. 6 through 10, the details of the construction of the second undercarriage 30 will now be set forth. The undercarriage 30 includes a pair of side channels 172 and 174 having edge flanges, the flanges for channel 172 being shown 176 and 178. The forward and rearward ends of channel 172 have secured thereto supporting plates 180 and 182, respectively, which effectively bridge the edge flanges 176 and 178 to form a box-like construction. A pair of vertically positioned brackets 184 and 186 situated at one rearward end of channel 172, and axle 188 for one set of the wheels 36 extends between brackets 184 and 186. The depending portions of brackets 184 and 186 are pinned together by bolt 190. A substantial vertical clearance is provided between axle 188 and the bolt 190, and axle 188 is permitted to rest on the lower edge of flange 176 of channel 172. A guide plate 192 is carried by axle 188 and it extends upwardly adjacent the outer face of channel 172. Also, guide blocks 194 are welded or otherwise secured to axle 188 adjacent the inner edge of flange 176. The presence of guide plate 192 and blocks 194 limits the degree of transverse movement of axle 188 with respect to channel 172, although a substantial vertical movement of axle 188 with respect to channel 172 is accommodated by reason of the lost motion gap between pin 190 and axle 188.

The opposite end of axle 188 is supported by the rearward end of channel 174 in a fashion similar to the connection between axle 188 and channel 172 previously described. This connection between axle 188 and channel 174 includes a pair of brackets which straddle axle 188, one of these brackets being shown in FIG. 7 at 196. A tie bolt 198 is provided as shown to accommodate a limited degree of relative movement between the left hand side of axle 188 as viewed in FIG. 7 with respect to the channel 174. The axle 188 engages the lowermost flange of channel 174, and transverse relative movement between axle 188 and flange 174 is permitted by guide plate 200 and blocks 202.

As best seen in FIGS. 6 and 8, the forward end of the undercarriage 30 is suspended in a manner similar to the suspension above described for the rearwardly disposed portion of the undercarriage and the associated wheels 36. The wheels 34 at the forward end of the undercarriage 30 are journaled on a rigid axle identified by reference character 204, and the axle in turn is adapted to engage the lower flange 176 of channel 172 as indicated. A pair of guide plates 206 and 208 is fixed on axle 204 adjacent either side thereof, and these plates extend upwardly and are situated adjacent the outer side channels 172 and 174, respectively. Guide plates 206 and 208 maintain the desired transverse position of the axle 204 for the wheels 34. A pair of guide blocks 210 and 212 are carried by axle 204 adjacent the inner sides of channels 172 and 174 in order to supplement the guiding function of guide plates 206 and 208. Brackets 214 and 216 are secured to channel 172 and they straddle axle 204. As best seen in FIG. 6, a tie bolt 218 interconnects brackets 214 and 216, and a sufficient clearance is provided between tie bolt 218 and axle 204 to permit a limited degree of vertical displacement of wheels 34 during operation. In a similar fashion, a pair of brackets is provided at the forward end of channel 174, one of which is shown at 220 in FIG. 8. These brackets also straddle axle 204, and a tie bolt 222 is provided to retain axle 204 while at the same time permitting a limited degree of vertical displacement of wheels 34 with respect to the undercarriage frame structure. A pair of brackets 221 is secured to the forward ends of channels 172 and a tie bar 223 interconnects the same as indicated.

An eyelet or plate 225 is secured to axle 204 and a corresponding eyelet 227 is secured to cross member 56. A chain may be used to tie these eyelets together when the operator desires to jack up the wheels 34 as indicated in FIG. 2.

Referring now more particularly to FIGS. 6 and 9, the means for supporting the platform 26 on the undercarriage 30 will be particularly pointed out. A pivot bar 224 is transversely disposed across the interior of the undercarriage between the channels 172 and 174, and the ends thereof are journalled within suitable bearing recesses formed in channels 172 and 174, the channel 172 having a bearing cap 226 and channel 174 having a bearing cap 228. Each of the bearing caps 226 and 228 accommodates a bushing within which a bearing spindle on each end of shaft 224 is received, the channels 172 and 174 being suitably apertured to receive these bearing spindles.

A boxed frame member 230 extends longitudinally with respect to the center line of undercarriage 30 and it rests on one end of the axle 224 as indicated in FIG. 9 and also in FIG. 6. A similar boxed frame member 232 is situated on the opposite side of the undercarriage 30 in longitudinal disposition, and it also rests on bar 224. The members 230 and 232 are joined together at their intermediate regions by means of a supporting plate 234.

The members 230 and 232 are joined together by transversely situated I-beam members 236, 238 and 240, and these I-beam members in turn are welded or otherwise secured to the underside of side rails 48 and 50 of the platform 26. To provide added support a pair of plates 242 and 244 is secured to the members 230 and 232 in transverse disposition, and these plates are also secured to the underside of side rails 48 and 50 of the platform 26. Plates 242 and 244 are disposed at an angle, as indicated in FIG. 6, which permits increased resistance to longitudinally disposed shock blows transmitted to the undercarriage through wheel suspensions.

At the forward end of the undercarriage 30 I have provided a pair of depending guide bars as indicated at 246 and 248. These guide bars are preferably of angle construction and they are joined together at the lowermost portions thereof by a cross member 250. Guide bar 246 is secured to member 230 and guide bar 248 is secured to member 232. As indicated in FIG. 8, a pair of angularly disposed members 252 and 254 interconnects I-beam 236 and the cross member 250. The rearmost ends of channels 172 and 174 have secured thereto a pair of brackets 203 and a tie bar 205 interconnects the same as indicated.

It is apparent from the foregoing that the undercarriage frame structure 36 of which channels 172 and 174 form a part is adapted to rotate about the pivotal axis of bar 224, and this pivotal motion is guided by the guide bars 246 and 248. As best seen in FIG. 11, the undercarriage frame structure is adapted to assume any of a variety of angular positions with respect to the platform 26 and the platform 26 is therefore maintained in a relatively stable horizontal position regardless of irregularities in the road surface. If is also apparent from an inspection of FIGS. 10 and 11 that the individual wheels 34 and 36 may be displaced about the longitudinal axis of the undercarriage by reason of the lost motion permitted by the suspension axles 188 and 204. Stability of the platform 26 is therefore maintained regardless of lateral or longitudinal deviations of the road wheels 34 and 36.

It is also apparent that forward undercarriage 28 may also pivot about its connection with the superstructure and this also contributes to the stability of the platform 26. When the carrier is loaded, the angularity of the undercarriage 28 relative to the platform 26 will change from that shown in FIG. 5 to that shown in FIG. 6. The spring suspension 22 will deflect under load, but the pivotal connection between undercarriage 28 and platform 26 will tend to maintain a level position of the latter.

While I have particularly described a preferred embodiment of my invention, I contemplate that variations therein may be made without departing from the scope of my invention as defined by the following claims.

What I claim is:

1. A cargo carrier for use with a wheeled tractor comprising a unitary load carrying platform, a first, forward, wheeled undercarriage, a second, rearward, wheeled undercarriage, fifth wheel structure providing a connection between said platform and said first undercarriage including a pivot means for accommodating pivotal motion of said first undercarriage about a transverse axis relative to said platform, said fifth wheel structure accommodating relative angular motion between the longitudinal center lines of said platform and said first undercarriage, a pivotal connection between said second undercarriage and said platform, said last named pivotal connection accommodating angular movement of said second undercarriage about a transverse axis relative to said platform, said first undercarriage including frame structure comprising longitudinally extending side rails, road engaging wheels suspended at the rearward portion of said side rails, second fifth wheel structure for providing a pivotal connection between the forward portion of said first undercarriage side rail members and a wheeled tractor, said second undercarriage comprising an inner frame structure fixedly secured to said platform, an outer frame structure including side rails disposed on either transverse side of said inner frame structure, the road engaging wheels of said second undercarriage being suspended on said outer frame structure, and a pivotal connection between said inner and outer frame structures at a location intermediate the road engaging wheels thereof.

2. A cargo carrier for use with a wheeled tractor comprising a unitary load carrying platform, a first, forward, wheeled undercarriage, a second, rearward, wheeled undercarriage, fifth wheel structure providing a connection between said platform and said first undercarriage including a pivot means for accommodating pivotal motion of said first undercarriage about a transverse axis relative to said platform, said fifth wheel structure accommodating relative angular motion between the longitudinal center lines of said platform and said first undercarriage, a pivotal connection between said second undercarriage and said platform, said last named pivotal connection accommodating angular movement of said second undercarriage about a transverse axis relative to said platform, said first undercarriage including frame structure comprising longitudinally extending side rails, road engaging wheels suspended at the rearward portion of said side rails, second fifth wheel structure for providing a pivotal connection between the forward portion of said first undercarriage side rail members and a wheeled tractor, said second undercarriage comprising an inner frame structure fixedly secured to said platform, an outer frame structure including side rails disposed on either transverse side of said inner frame structure, the road engaging wheels of said second undercarriage being suspended on said outer frame structure, a pivotal connection between said inner and outer frame structures at a location intermediate the road engaging wheels thereof, and guide means defined in part by said inner frame structure for permitting relative angular motion between said inner and outer frame structures without interference therebetween.

3. The combination as set forth in claim 2 wherein said guide means includes depending brackets carried by said intermediate frame structure at the forward portion thereof, said brackets being disposed adjacent the side rails of said outer frame structure.

4. A cargo carrier for use with a wheeled tractor comprising a unitary load carrying platform, a first, forward, wheeled undercarriage, a second, rearward, wheeled undercarriage, fifth wheel structure providing a connection between said platform and said first undercarriage including a pivot means for accommodating pivotal motion of said first undercarriage about a transverse axis relative to said platform, said fifth wheel structure accommodating relative angular motion between the longitudinal center lines of said platform and said first undercarriage, a pivotal connection between said second undercarriage and said platform, said last named pivotal connection accommodating angular movement of said second undercarriage about a transverse axis relative to said platform, said first undercarriage including frame structure comprising longitudinally extending side rails, road engaging wheels suspended at the rearward portion of said side rails, second fifth wheel structure for providing a pivotal connection between the forward portion of said first undercarriage side rail members and a wheeled tractor, said second undercarriage comprising an inner frame structure fixedly secured to said platform, an outer frame structure including side rails disposed on either transverse side of said inner frame structure, the road engaging wheels of said second undercarriage being suspended on said outer frame structure, and a pivotal connection between said inner and outer frame structures at a location intermediate the road engaging wheels thereof, the wheels for said second undercarriage being journalled on solid axles, said axles being carried by said outer frame structure, the connection between said axles and said outer frame structure including means for accommodating a lost motion between each side rail of said outer frame structure and said axles.

5. A cargo carrier for use with a wheeled tractor comprising a unitary load carrying platform, a first, forward, wheeled undercarriage, a second, rearward, wheeled undercarriage, fifth wheel structure providing a connection between said platform and said first undercarriage including a pivot means for accommodating pivotal motion of said first undercarriage about a transverse axis relative to said platform, said fifth wheel structure accommodating relative angular motion between the longitudinal center lines of said platform and said first undercarriage, a pivotal connection between said second undercarriage and said platform, said last named pivotal connection accommodating angular movement of said second undercarriage about a transverse axis relative to said platform, said first undercarriage including frame structure comprising longitudinally extending side rails, road engaging wheels suspended at the rearward portion of said side rails, second fifth wheel structure for providing a pivotal connection between the forward portion of said first undercarriage side rail members and a wheeled tractor, said second undercarriage comprising an inner frame structure fixedly secured to said platform, an outer frame structure including side rails disposed on either transverse side of said inner frame structure, the road engaging wheels of said second undercarriage being suspended on said outer frame structure, a pivotal connection between said inner and outer frame structures at a location intermediate the road engaging wheels thereof, the wheels for said second undercarriage being journalled on solid axles, said axles being carried by said outer frame structure, the connection between said axles and said outer frame structure including means for accommodating a lost motion between each side rail of said outer frame structure and said axles, and guide brackets carried by each solid axle including a portion extending adjacent the side rails of said outer frame structure, said brackets limiting transverse movement of said axles with respect to the inner and outer frame structures of said second undercarriage.

6. A cargo carrier for use with a wheeled tractor comprising a unitary load carrying platform, a first, forward, wheeled undercarriage, a second, rearward, wheeled undercarriage, fifth wheel structure providing a connection between said platform and said first undercarriage including a pivot means for accommodating pivotal motion of said first undercarriage about a transverse axis relative to said platform, said fifth wheel structure accommodating relative angular motion between the longitudinal center lines of said platform and said first undercarriage, a pivotal connection between said second undercarriage and said platform, said last named pivotal connection accommodating angular movement of said undercarriage about a transverse axis relative to said platform, said first undercarriage including frame structure comprising longitudinally extending side rails, road engaging wheels suspended at the rearward portion of said side rails, second fifth wheel structure for providing a pivotal connection between the forward portion of said first undercarriage side rail members and a wheeled tractor, said second undercarriage comprising an inner frame structure fixedly secured to said platform, an outer frame structure including side rails disposed on either transverse side of said inner frame structure, the road engaging wheels of said second undercarriage being suspended on said outer frame structure, a pivotal connection between said inner and outer frame structures at a location intermediate the road engaging wheels thereof, said last named pivotal connection comprising a pivot bar extending transversely between the side rails of said outer frame structure, bearing means at either end of said pivot bar for journalling the same with respect to the side rails of said outer frame structure, and platform supporting members engageable with and supported by said pivot bar.

References Cited in the file of this patent
UNITED STATES PATENTS

| | | |
|---|---|---|
| 2,126,819 | Schawlem | Aug. 16, 1938 |
| 2,662,781 | Hopson | Dec. 15, 1953 |
| 2,698,759 | Ronning | Jan. 4, 1955 |
| 2,816,776 | Nimtz | Dec. 17, 1957 |
| 2,902,289 | North | Sept. 1, 1959 |
| 2,919,928 | Hoffer | Jan. 5, 1960 |